Dec. 11, 1962     D. A. PALMITER     3,067,658
EARTH COMPACTION ROLL

Filed Feb. 19, 1960     2 Sheets-Sheet 1

INVENTOR.
DANIEL A. PALMITER
BY
Buckhorn, Cheatham & Blore
ATTORNEYS

Dec. 11, 1962  D. A. PALMITER  3,067,658
EARTH COMPACTION ROLL

Filed Feb. 19, 1960  2 Sheets-Sheet 2

INVENTOR.
DANIEL A. PALMITER
BY
Buckhorn, Cheatham & Blore
ATTORNEYS

United States Patent Office 3,067,658
Patented Dec. 11, 1962

---

3,067,658
EARTH COMPACTION ROLL
Daniel A. Palmiter, Alhambra, Calif., assignor, by mesne assignments, to Hyster Company, Portland, Oreg., a corporation of Nevada
Filed Feb. 19, 1960, Ser. No. 9,724
8 Claims. (Cl. 94—50)

This invention relates to earth compaction equipment, both of the power driven and of the trailer type. The invention is particularly concerned with segmental type rollers having pads for engaging the soil.

A compaction rig that has come into considerable use in recent years is a tractor-trailer combination in which compaction rolls are substituted for the conventional rubber-tired traction wheels of the tractor so as to compact strips on either side of the strip compacted by the trailer wheels to achieve a considerable increase in the area compacted for one pass of the machine. One disadvantage of this type of rig is that under many operating conditions and particularly on grades, there is considerable slippage of the power driven wheels because of insufficient traction. This not only decreases the operating efficiency of the rig, but results in rapid wear of the ground engaging surfaces of the traction wheels. Of course, traction can be increased by adding weights on the rig, but this adds to the cost of operating the rig and besides too much weight results in inefficient compaction because the pads merely push the soil aside and punch holes in it, rather than compacting the soil.

It is a main object of the present invention to provide a traction wheel of the pad type that has substantially higher traction characteristics than prior pad type wheels without requiring the addition of weights and without decreasing the compaction capabilities of the wheel.

Another object of the invention is to provide a roll having pads which are designed to convert the traction forces into compaction forces so that increasing resistance to movement results in greater compaction without loss of traction.

Another object of the invention is to provide a roll having pads constructed so that when loose earth is encountered, large compaction areas are presented, when packed earth is encountered, smaller areas are presented.

A further object of the invention is to provide a roll as just described in which the compaction areas presented progressively decrease with increasing soil strength so that instead of the compaction force per unit area increasing abruptly, it increases progressively as the soil strength increases.

Various other objects of the invention will be apparent from the following description taken in connection with the accompanying drawings, wherein.

Figure 1:
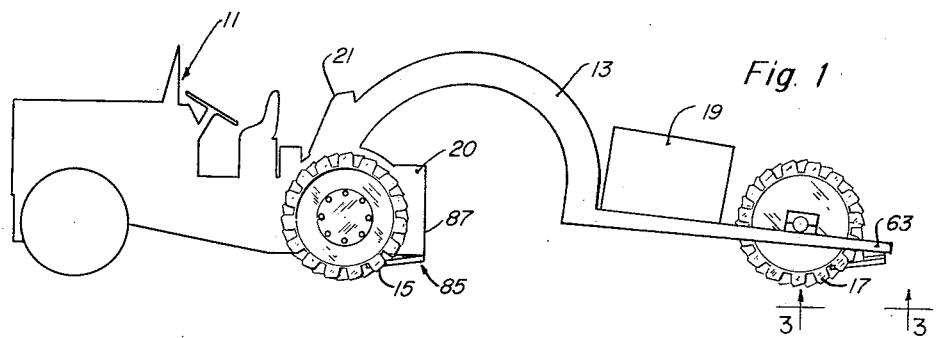
FIG. 1 is a view of a rig equipped with rolls of the present invention.

Referring to FIG. 1, the rig disclosed includes a tractor 11 pulling a trailer generally entitled 13. The rear traction wheels of the tractor comprise rolls 15 of the subject invention and the wheels of the trailer 13 also comprise rolls 17 of the present invention. There are weights 19 on the trailer and weights 20 on the tractor to apply downward pressure on the wheels 15 and 17. The trailer 13 has a pivotal connection at 21 with the rear end of the tractor frame.

Figure 5:
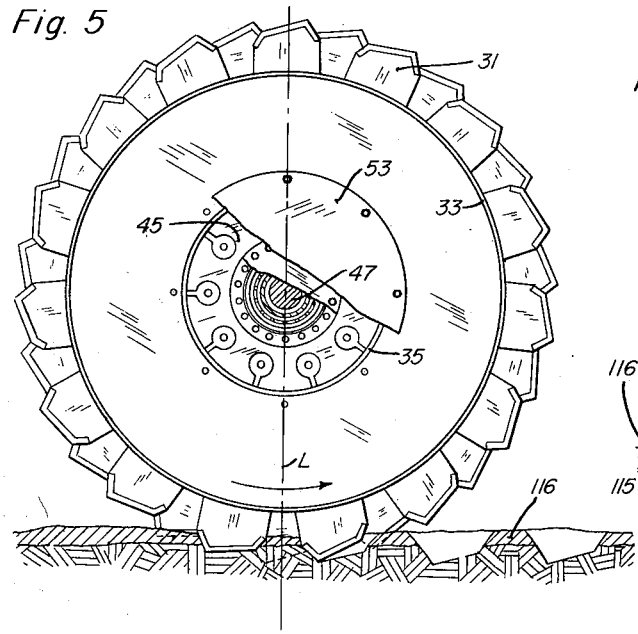
FIG. 5 is an enlarged side view of a traction roll, parts being broken away for convenience in illustration.
Figure 6:
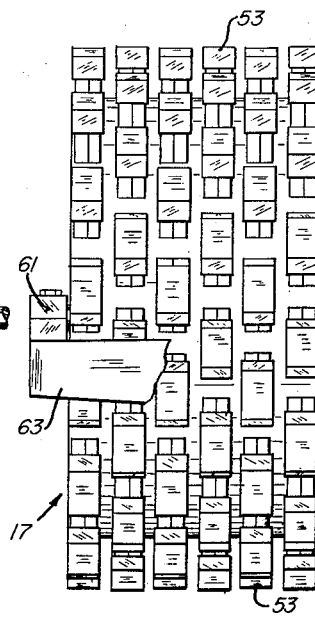
FIG. 6 is a rear view of the traction roll, parts being broken away and parts being shown in section for convenience in illustration.

Referring to FIGS. 5 and 6, the traction wheel shown is in the form of a hollow drum carrying a plurality of pads 31. The drum includes a cylindrical rim 33 and a tubular hub housing 35 secured together by spaced annular end plates 37 and 39.

The dead axle 41 of the tractor projects into the hub housing 35 and is rotatably connected thereto by a hub assembly generally indicated by the reference numeral 43. This assembly comprises an outer disc structure 45 secured to the hub housing 35 and having a bearing 46 mounted on the dead axle 41. The live axle 47 is bolted to the outer disc structure 45. The assembly also includes an inner disc structure 49 secured to the hub housing and having a bearing 50 mounted on the dead axle 41. A brake drum B is secured to the inner disc assembly 49. The remaining parts of the brake have not been shown and are not necessary for an understanding of the present invention. A cover plate 53 is bolted to the annular plate 37.

Figure 2:
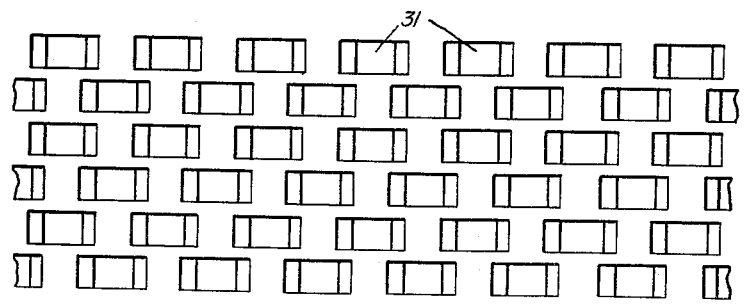
FIG. 2 is a development of part of the pads of a roll.

Referring to FIGS. 2, 5 and 6, the pads 31 of the roll 15 are mounted on the rim 33 to provide a plurality of spaced annular rows of pads, six in the particular form of the invention shown, wherein the pads of each row are staggered with relation to the pads of each adjacent row. The pads of alternate rows are, however, aligned with one another considered laterally on the wheel. The pads of a row are equally spaced relative to one another in a circumferential direction, and the spacing of the pads of each row is the same. The circumferential gap or space between two adjacent pads in a row is smaller than the circumferential length of a pad. Also, a pad has a circumferential length considerably greater than its lateral dimension. The above relationships of the pads are also true for a trailer wheel 17.

Figure 7:
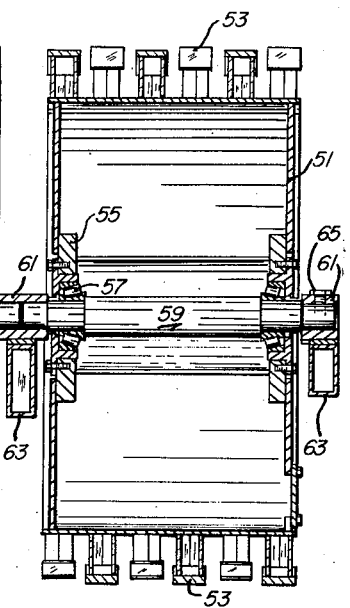
FIG. 7 is a rear view of the trailer rolls, the right-hand roll being shown in section.

FIG. 7 shows the construction of trailer wheel or roll. Each trailer wheel is also in the form of a hollow drum generally entitled 51 carrying pads 53 which are identical to pads 31 of a traction wheel 15. The drum 51 includes heavy bearing supporting plates 55 housing bearings 57 mounted on a shaft 59. The shaft extends through the roll and is received by mounting blocks 61 secured to the frame 63 of the trailer 13. A bolt 65 holds the shaft against rotation.

Figure 3:
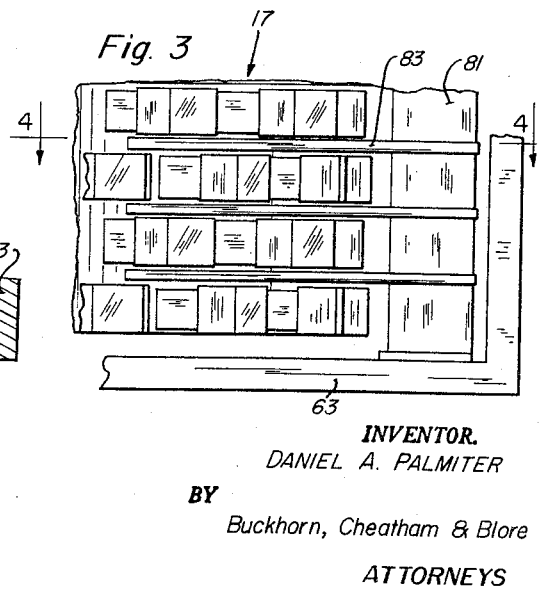
FIG. 3 is a fragmentary bottom view taken in the direction of the arrows 3—3 in FIG. 1.
Figure 4:
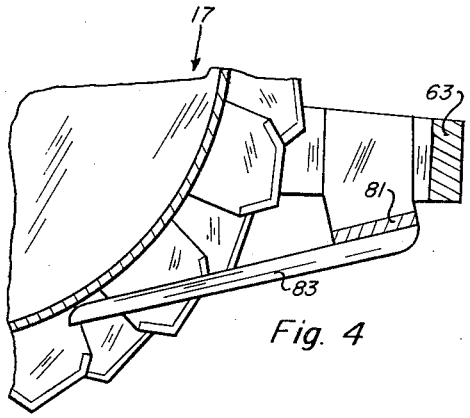
FIG. 4 is a section taken along line 4—4 of FIG. 3.

Referring to FIGS. 1, 3 and 4, a cleaner is provide for each trailer wheel or roll and comprises a transversely extending support 81 carrying a plurality of prongs 83 projecting into the annular spaces between the rows of pads. The support is secured to the trailer frame 63. The earth compacted in the annular spaces between the rows of pads is removed by the prongs, and the earth between the pads in a row is subjected to the pulling action of a pair of prongs in the adjacent annular spaces and since such earth has little lateral support, this earth is normally dislodged when passing by the cleaner prongs 83.

Two similar cleaners 85 are provided for the traction wheels and are secured to the tractor frame.

Referring to FIGS. 5, 6, 7 and 8, a pad 31 comprises a radially extending pedestal portion in the form of a hollow column of generally rectangular cross section welded at its inner or base end to the rim 33. Each pad has its side walls 91 projecting beyond its end walls 93 as is apparent from FIG. 8, and these projecting portions are formed with angular edges to fit the inner contour of an angular cap 95 welded to the column. The cap has a flat main working face 97, a flat leading face 99, and a flat trailing face 101. In the particular pad shown, the main face 97 forms an angle of 15 degrees with the normal N to the medial radial line R through the pad. The main face 97 also forms an obtuse angle of approximately 135 degrees with the leading face 99, while the trailing face forms an obtuse angle of approximately 110 degrees with the main face. These latter angles are not especially critical, but they must be obtuse angles.

Another way of considering the angular relationship of the main working face is that the main working face forms an angle of other than 90 degrees with the medial radial line R, and the smaller angle formed by the intersection of the main face and such line is greater than 45 degrees, in the specific illustration shown, being 75 degrees.

Figure 8:
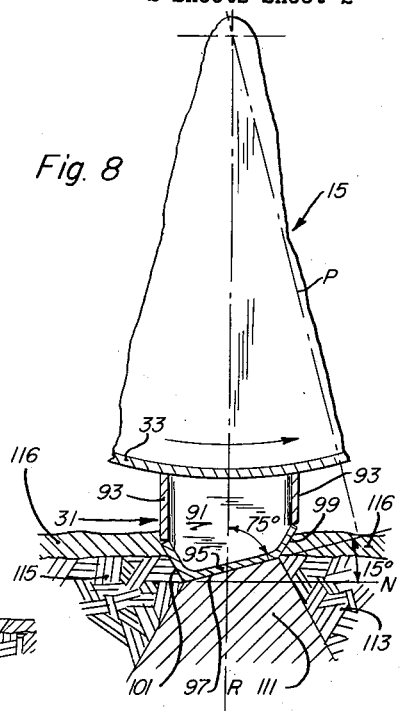
FIG. 8 is a somewhat diagrammatic sectional view in elevation, on an enlarged scale, showing a pad in its fully operative position.
Figure 8:
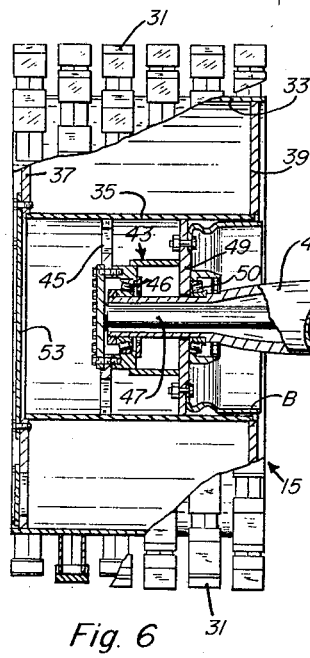

As shown in FIG. 8, the section of earth 111 directly beneath the main working face, is highly compacted in contrast with the sections 113 and 115 adjacent the leading and trailing faces 99 and 101. The fluff 116 is of course very loose. In order for the foot or pad to slip, the foot would have to further compact the already compacted soil 111. It is possible for the pad simply to move up the incline formed by the upper face of the compacted earth 111, but it is assumed that the weight of the roller is sufficient to hold the roller down to enable the roller to shear this earth completely away before the roller would elevated any substantial extent. Therefore, it can be seen that the traction forces which would tend to create slippage actually are converted into compaction forces.

If, on the other hand, the main working face 97 were normal to the radial line R, once the static friction holding the pad against slippage was overcome, the pad could easily continue to slip because the only earth that would need to be dislodged would be the relatively uncompacted earth 113. However, relative movement of the pad 31 relative to the compacted earth 111 does not make it any easier for the pad to slip because the pad has to either continue to climb the face of the compacted earth 111 or to further compact the earth.

Another advantage of the pad of the present invention is that the pad is capable of firmly and effectively compacting loose soil because as shown in FIG. 5, the main working face comes into parallelism with the ground to engage such loose soil in a generally flush relationship prior to such face reaching its lowermost or fully operative position at the center line L of the wheel.

On the other hand, when the soil is already compacted to some extent, the first portion of the pad to come into contact with the ground is the corner or "high point" of the pad formed at the intersection of the main face 97 and the trailing face 101. This means that there is less area of contact of the pad with the soil and thus the compaction forces available per unit area are considerably more than when the flat face engages the ground. It is also pointed out that because the mentioned corner is of triangular configuration, the unit compaction force available increases in an infinitely progressive fashion with increasing soil strengths. This means that the unit compaction force available can be proportioned to soil strength so as not to exceed the strength of the soil at any time during a compaction job. If it did exceed the soil strength, the soil would be pushed to one side rather than compacted. This would decrease the operating efficiency.

Referring to FIGS. 5 and 8, it is apparent that when the corners or "high points" 97 and 101 of the lowermost pads are in their lowermost positions, the circumferentially adjacent pads have their corresponding corners or "high points" disposed at a level above that of the first-mentioned corners or "high points" and thus do not interfere with penetration of such first-mentioned corners into partially compacted soil.

Referring to FIG. 8, it is apparent that the radial line P that is perpendicular to the plane of the main working face 97 does not pass through the pad but is circumferentially spaced therefrom. This spacing will vary with variations in the angle of the main working face 97. As before stated, in the pad shown, this angle is 15 degrees relative to the line N. However, the angle may be varied between 10 degrees and 30 degrees. Below 10 degrees, the traction characteristics rapidly fall off, and above 30 degrees, the compaction characteristics for large area compaction rapidly fall off.

With the 15 degree angle shown, a roll of the present invention, when tested, had an increase in traction over a roll pad having a "straight" main face (i.e. the main face being parallel with the line N) of 25 percent to 40 percent without loss of compaction characteristics.

Having described the invention in what is considered to be the preferred embodiment thereof, it is desired that it be understood that the invention is not to be limited other than by the provisions of the following claims.

I claim:

1. A trailer having a front end and a rear end, said trailer including at least one earth compaction roll, said roll comprising a cylindrical support member, a plurality of compaction pads on said support member, each of said plurality of pads including a radially extending pedestal portion terminating in an outwardly facing ground-engaging surface, said surface including three angularly related faces arranged in end-to-end relationship circumferentially of said cylindrical support member and being parallel to the central axis of said support member, the central face of a pad intersecting the associated flanking faces at different angles so that the pad is unsymmetrical about a radial line which extends medially therethrough and which is perpendicular to the central axis of said support member, the central face of each pad obliquely intersecting the associated just mentioned radial line, the central face of a pad when in its lowermost position being inclined upwardly and rearwardly.

2. An earth compaction roll having a cylindrical surface,
a plurality of annular rows of compaction pads secured to the surface of said roll,
each pad having a main working face for engagement with the ground,
each main working face being generally centrally disposed relative to its pad,
each face intersecting at an angle other than 90 degrees a radial line which extends medially through each face and which is perpendicular to the central axis of said cylindrical compaction roll,
said main face of the pad when in its lowermost position being inclined upwardly and rearwardly toward said cylindrical surface and forming an acute angle greater than 45 degrees with said medial radial line.

3. An earth compaction roll comprising a rigid drum having a cylindrical surface,
a plurality of rows of compaction pads secured to such surface,
the pads being of identical construction,
the pads of each row being uniformally circumferentially spaced with the space between any two pads of a row being of lesser dimension than the circumferential dimension of a pad,
each pad having a flat, outwardly facing main working face for engagement with the ground,
each main working face being generally centrally disposed relative to its pad,
each face obliquely intersecting a radial line which extends medially through such face and which is perpendicular to the central axis of said drum,
the main working face of each pad when in its lowermost position being inclined upwardly and rearwardly toward the periphery of said drum and forming an acute angle greater than 45 degrees with said medial radial line, the pads of a row being in staggered relation to the pads of any immediately adjacent row, the height of a pad relative to the angularity of its main working face being such that the plane of such main working face is disposed in spaced relation outwardly of said cylindrical surface, the angularity of the main working face of a pad being such, relative to its circumferential length, that all radial lines which intersect such main working face have an oblique relation thereto.

4. An earth compaction roll comprising a support member of circular cross section, a plurality of rows of compaction pads secured to said member, each pad having a flat, outwardly facing main working face for engagement with the ground, each main working face being generally centrally disposed relative to its pad, each face obliquely intersecting a radial line which extends medially through such face and which is perpendicular to the central axis of said member, the main working face of each pad when in its lowermost position being inclined upwardly and rearwardly toward the periphery of said member and forming an acute angle greater than 45 degrees with said medial radial line, the height of a pad relative to the angularity of its main working face being such that the plane of such main working face is disposed in spaced relation outwardly of the periphery of said member, the angularity of the main working face of a pad being such, relative to its circumferential length, that all radial lines which intersect such main working face have an oblique relation thereto.

5. An earth compacting roll having a cylindrical support surface, a plurality of annular rows of compaction pads secured to the cylindrical surface of said roll, each pad having a main ground engaging working face and two ground engaging end faces disposed in circumferential flanking relation with respect to the associated main working face and disposed one on either side of said main working face, each of the end faces of the pad forming an inwardly directed obtuse angle with the associated main working face, each main working face being generally centrally disposed relative to its pad, each main face obliquely intersecting a radial line which extends medially through each main face and which is perpendicular to the central axis of said cylindrical compaction roll, said main face of the pad when in its lowermost position being inclined upwardly and rearwardly toward the periphery of said roll and forming an acute angle greater than 45 degrees with said medial radial line.

6. An earth compacting vehicle having a front end and a rear end, said vehicle having at least one ground engaging wheel, said wheel comprising a drum having a cylindrical support surface, a plurality of annular rows of compaction pads secured to the surface of said drum, each pad having a main working face for engagement with the ground, each main working face being generally centrally disposed relative to its pad.

each face intersecting at an angle other than 90 degrees a radial line which extends medially through each face and which is perpendicular to the central axis of said surface, said main face of the pad when in its lowermost position being inclined upwardly and rearwardly toward said cylindrical surface and forming an acute angle greater than 45 degrees with said medial radial line.

7. An earth compacting roll having a cylindrical support surface, a plurality of annular rows of compaction pads secured to the cylindrical surface of said roll, the pads being of identical construction, the pads of each row being uniformally circumferentially spaced with the space between any two pads of a row being of lesser dimension than the circumferential dimension of a pad, each pad having a flat, outwardly facing main ground engaging working face and two ground engaging end faces disposed in circumferential flanking relation with respect to the associated main working face and disposed one on either side of said main working face, each of the end faces of the pad forming an inwardly directed obtuse angle with the associated main working face, each main working face being generally centrally disposed relative to its pad, each main face obliquely intersecting a radial line which extends medially through each main face and which is perpendicular to the central axis of said cylindrical compaction roll, said main face of the pad when in its lowermost position being inclined upwardly and rearwardly toward the periphery of said roll and forming an acute angle greater than 45 degrees with said medial radial line, the pads of a row being in staggered relation to the pads of any immediately adjacent row, the height of a pad relative to the angularity of its main working face being such that the plane of such main working face is disposed in spaced relation outwardly of said cylindrical surface, the angularity of the main working face of a pad being such, relative to its circumferential length, that all radial lines which intersect such main working face have an oblique relation thereto.

8. An earth compaction roll having a cylindrical surface, a plurality of annular rows of compaction pads secured to the surface of said roll, each pad having a main working face for engagement with the ground, each main working face being generally centrally disposed relative to its pad, each face obliquely intersecting a radial line which extends medially through each face and which is perpendicular to the central axis of said cylindrical compaction roll, said main face of the pad when in its lowermost position being inclined upwardly and rearwardly toward said cylindrical surface and forming an acute angle of between 60 and 80 degrees with said medial radial line.

References Cited in the file of this patent

UNITED STATES PATENTS

| | | |
|---|---|---|
| 1,905,384 | Jass | Apr. 25, 1933 |
| 2,197,549 | Hargrave et al. | Apr. 16, 1940 |
| 2,484,285 | Greiner | Oct. 11, 1949 |
| 2,617,488 | Marshall | Nov. 11, 1952 |
| 2,754,734 | Gardner | July 17, 1956 |

FOREIGN PATENTS

| | | |
|---|---|---|
| 258,951 | Italy | June 9, 1929 |
| 591,437 | Great Britain | Aug. 18, 1947 |